(12) United States Patent
Sugihara

(10) Patent No.: US 6,385,197 B1
(45) Date of Patent: May 7, 2002

(54) VIRTUAL PORT TRUNKING METHOD AND APPARATUS

(75) Inventor: Tomoyuki Sugihara, Kanagawa-ken (JP)

(73) Assignee: Allied Telesyn International Corp., Sunnyvale, CA (US)

(*) Notice: Subject to any disclaimer, the term of this patent is extended or adjusted under 35 U.S.C. 154(b) by 0 days.

(21) Appl. No.: 09/350,748

(22) Filed: Jul. 9, 1999

(51) Int. Cl.[7] .......................... H04L 12/56; G06F 12/00
(52) U.S. Cl. ................... 370/380; 370/395; 370/397; 370/409; 711/206; 714/3
(58) Field of Search ................ 370/380, 390, 370/395, 397, 400, 401, 409, 419, 420, 463; 709/223, 249, 250; 711/202, 203, 206, 221; 714/38, 3

(56) References Cited

U.S. PATENT DOCUMENTS

| | | |
|---|---|---|
| 5,509,123 A | 4/1996 | Cormier |
| 5,737,518 A * | 4/1998 | Grover et al. ............... 714/38 |
| 5,764,638 A | 6/1998 | Ketchum |
| 5,982,753 A * | 11/1999 | Pendleton et al. .......... 370/252 |
| 6,108,782 A * | 8/2000 | Fletcher et al. ............. 709/224 |
| 6,167,403 A * | 12/2000 | Whitmire et al. ........... 709/223 |

FOREIGN PATENT DOCUMENTS

EP   0891061   1/1999

OTHER PUBLICATIONS

"Dynamic Bandwidth Allocation for Striping and HUnt Groups in a Switced Network" Jun. 1993, IBM Technical Disclosure Bulletin. vol. 36 No. 06A, pp. 145, 146.*

* cited by examiner

Primary Examiner—Alpus H. Hsu
Assistant Examiner—Afsar M. Qureshi
(74) Attorney, Agent, or Firm—Cooley Godward LLP

(57) ABSTRACT

A novel virtual port method and apparatus for use in the communication between multiple nodes in a network system is disclosed. Particularly, the virtual port concept is implemented in a switching unit having a plurality of physical ports. According to the present invention, at least one virtual port can be defined by the user to represent a corresponding number of group of physical ports. In this case, a single virtual port identification can be used by the network manager to identify all the physical ports belonging to a trunking group. By using one virtual port identification address instead of a group of physical port addresses, a tremendous reduction in processing overhead in the network manager can be achieved.

12 Claims, 7 Drawing Sheets

| Virtual Port | Trunking Group | Member Ports |
|---|---|---|
| 27 | 1 | 3, 4, 7 |
| 28 | 2 | 13, 14 |
| 29 | 3 | Not Used |
| 30 | 4 | Not Used |

| Virtual Port | Trunking Group | Stack ID | Member Ports |
|---|---|---|---|
| 27 | 1 | S1 | 3, 4, 7 |
| 28 | 2 | S1 | 13, 14 |
| 29 | 3 | Not Used | |
| 30 | 4 | Not Used | |

VIRTUAL PORT TRUNKING METHOD AND APPARATUS

BACKGROUND OF THE INVENTION

The present invention relates generally to the management of network switches and more particularly to a mechanism for simplifying the maintenance of the ports of a network switch.

Network management is defined as the management of network devices, such as workgroup hubs, switches, routers, bridges, and so on, as well as the management of the wires interconnecting them. FIG. 1 shows a typical network management model 100. The underlying base consists of the network management applications 110 used to manage the network. These management applications should have a consistent end-user interface and preferably a command data repository. It goes without saying that the user interface must be intuitive, user friendly, customizable, and consistent across all the applications. A common data repository 120 is desirable to avoid duplication of data and to allow access to the stored information by all applications. In addition, network management applications 110 should snap together seamlessly with desktop and business management applications.

The first standard for network management evolved into a specification that became known as SNMP (Simple Network Management Protocol). It was based on the TCP/IP protocol stack and was given the request for comment (RFC) number 1067 by the Internet Engineering Task Force (IETF). The workhorse of the SNMP specification is the Management Information Base (MIB). The MIB is a collection of information (or objects) about the managed device. Although the term MIB can be used to mean many different things, we use it to mean the actual data stored in an SNMP device or the description of that data. These MIB objects are standardized across a class of devices, so a management station can retrieve all object information from various devices or cause an action to take place at an agent by manipulating these objects. The configuration settings of a device can also be changed by this method.

By embedding SNMP within data communication devices, multivendor management systems can manage these devices from a central site and view information graphically. The many SNMP management applications available today usually run on most of the current operating systems, such as UNIX, Windows (TM) 98, and Windows NT (TM) 5.0. Most high-end products are designed to cope with relatively large networks and thus run on powerful machines using the scaleable UNIX operating system.

The SNMP operational model is based on four elements: the management station, the management agent, the network management protocol, and the Management Information Base (MIB). The management station serves as an interface tool to the managed elements of the network. The management station usually has a graphical user interface that is used to monitor and control the network via a network interface card (NIC).

FIG. 2 shows a network system 200 comprising a network manager 210 and a network agent 220. In this example, the network management protocol used for intercommunication between the management station and the agents is actually called SNMP and has the following defined functions:

1. Get enables the management station to retrieve the information objects from the agent.
2. Set allows the management station to set the values of the management objects at the agent.
3. GetNext allows the management station to retrieve the next sequential information in the management objects from the agent.
4. Trap is an unsolicited message from the agent to the management station that notifies the management station of any important events.

A managed device has a management agent that responds to requests for information and requests for actions from the management station. This agent may also provide the management station with unsolicited information by means of a trap. Key network devices, such as hubs, routers, and bridges, must therefore provide this management agent (often referred to as an SNMP agent or as being SNMP-capable) for them to be manageable via the SNMP management station.

In general, there is a standard way of describing the objects contained in a MIB. But for a management station to understand and access objects on different devices, the representation of particular resources must be the same on each node in the network. The structure of management information, which is specified in RFC 1155, defines the general framework within each MIB and can be defined generically and constructed to ensure consistency. In addition, each enterprise can define its own private MIBs to provide more detailed information about its specific managed devices. The problem with a generic MIB is that the objects defined therein are sometimes not sufficient for detailed management of particularly network devices. This is especially true with the new Layer 2/3 switches, the private MIB is important with these devices because each vendor talks to its switch differently. This means each vendor must supply detailed information via the enterprise-specific private MIB. Management applications use private MIBs to provide detailed, expanded views of the devices, to map out topologies of networks on the management platforms, and to configure and control switched environments containing virtual LANs (VLANs) and segmentation.

As mentioned above, basic SNMP capability alone does not really give the user good enough information about the LAN as a whole, but rather information about devices on the LAN. Therefore, an essential extension to SNMP is RMON capability. It should be noted that RMON is especially useful in monitoring and managing LANs.

RMON was drafted by the IETF and became a proposed standard in 1992 as RFC number 1271. The RMON specification was developed to provide traffic statistics and analysis on many network parameters for comprehensive network fault diagnosis, planning, and performance tuning. Ethernet was the initial focus and is described in the RFC 1271, but the remote monitoring functions were also extended to Token Ring in 1993 as RFC 1513.

RMON provides a standard set of MIBs that collect rich network statistical information not available through the basic SNMP MIBs. This information is basically everything you ever wanted to know about switches, so it is crucial in the management of network systems. RMON allows proactive network diagnostics by utilization of its powerful Alarm group. The Alarm group enables thresholds to be set for critical network parameters to automatically deliver alerts to centrally located management consoles. This is especially critical when managing Gigabit Ethernet switches, because full-wire speed management at that speed is virtually impossible.

RMON is especially critical for managing switches from a remote location because a switch keeps a full MIB information on a per-port basis, not a per-device basis. If you used regular SNMP to monitor a switch, port by port, it would result in a huge amount of SNMP traffic. With RMON support internal to the switch, this can be a quick and easy task. An RMON-enabled switch is responsible for collecting and acting on its own data as well as forwarding information to a central management station.

On shared segments, the traffic on a hub is echoed on all the ports. This means that there is no problem attached an RMON probe to one of the ports: all data will be seen by this probe and analyzed. In a switch, however, there is only port-to-port traffic. When the client on switch 1 talks to the server attached to port 3, for example, the probe connected to port 5 has no way of seeing this traffic unless one internal switch mechanism is put in place. This mechanism is often called port mirroring and is implemented by the switch itself. The user can configure different criteria for data to be steered to a monitor port.

One of the most important functions performed by network management is the configuration management of the system.

Configuration management consists of two major elements. One is the tracking of the physical and logical configuration of your network, and the second pertains to the configuration and upgrading of network devices such as hubs, switches, and routers.

Configuration management of the physical and logical topology is probably the most important part of network management in that the user cannot accurately manage a network unless the user can manage the configuration of the network. This is often done with help from powerful network configuration tools. Some network configuration tools will allow for both a physical and logical version of the network to be drawn, and keep a history of adds, moves, and changes to the network. This history becomes especially important when making the transition from shared media to a switch environment. It may be advantageous to go back to a previous configuration should there be problems with the new one, so make sure to back up this precious data often. Changes, additions, and deletions from the network need to dynamically update the configuration application's database to ensure consistency between the mapping of the real network and what the application represents.

It is also useful to have an application that will automatically discover the configuration of the network in the first place. This has traditionally been a proprietary feature of each vendor's management software, but recent standards work shows the industry is converging in this area as well. In the Desktop Management Task Force (DMTF), the industry working groups are defining a standard way to attribute a managed object, such as a router, switch, hub or NIC, to a particular database scheme. The database scheme will use this information to map network objects, PCs, and servers into an overall configuration. The advantage of this method is the configuration will automatically be updated when a network device changes its location or configuration.

Performance management is important for determining whether the user need to upgrade an existing network to Switched or Fast Ethernet. Performance management, however, needs to be a continuous task. Performance management can also help identify areas where switching or Fast Ethernet technology is not being utilized to its full extent.

To determine the performance level of a switch, the user can either configure the management station to poll for this data or set some thresholds in the switch and then perform calculations to compare the performance of that segment to some predetermined values. It is important to have some idea of what the baseline figures should be to make sensible decisions. Some applications can be used to monitor segments for a period of time and then recommend threshold figures. Having said that, traffic patterns vary from segment to segment and are generally based on intimate knowledge of the network and the perception of how it should behave.

However, in a conventional network system that supports port trunking, a great amount of redundant trunking ports information is required to be maintained and/or processed by the network manager. For example, in a trunking group comprising five trunking links connecting five ports of node 1 and five ports of node 4, port information on all five trunking ports of node 1 and node 4 are required to be stored in the network manager. Thus, port configuration data of a total of 10 ports (5 ports from node 1 and 5 ports from node 2) are maintained in the network manager. Because of the trunking definition, the port information on each of these trunking ports on either node are very similar, and redundant. Furthermore, in order to access this trunking group, redundant SNMP requests to each of the five trunking ports are repeatedly sent by the SNMP manager to node 1 and node 4. Because of these redundancies, a better and more efficient method and apparatus to address the plurality of trunking ports is desired.

Additional objects, features and advantages of various aspects of the present invention will become apparent from the following description of its preferred embodiments, which description should be taken in conjunction with the accompanying drawings.

SUMMARY OF THE INVENTION

It is therefore an object of the present invention to disclose a novel method of addressing multiple ports in a node connected to a network manager.

It is another object of the present invention to provide a method of supporting port trunking between multiple nodes.

It is yet another object of the present invention to provide an efficient way for the network manager to address multiple ports of a switching unit.

It is yet another object of the present invention to employ a logical addressing method to refer to multiple ports in a switching unit.

The present invention discloses a novel virtual port method and apparatus for use in the communication between multiple nodes in a network system. Particularly, the virtual port concept is implemented in a switching unit comprising a plurality of physical ports. According to the present invention, at least one virtual port can be defined by the user to represent a corresponding number of group of physical ports. In this case, a single virtual port identification can be used by the network manager to identify all the physical ports belonging to a trunking group. By using one virtual port identification address instead of a group of physical port addresses, a tremendous reduction in processing overhead in the network manager can be achieved.

BRIEF DESCRIPTION OF THE DRAWINGS

FIG. 5 shows a virtual port table illustrating the port assignment for the example as shown in FIGS. 3 and 4.

FIG. 6 shows a virtual port table of another preferred embodiment according to the present invention.

DETAILED DESCRIPTION OF THE DRAWINGS

Figure 1:
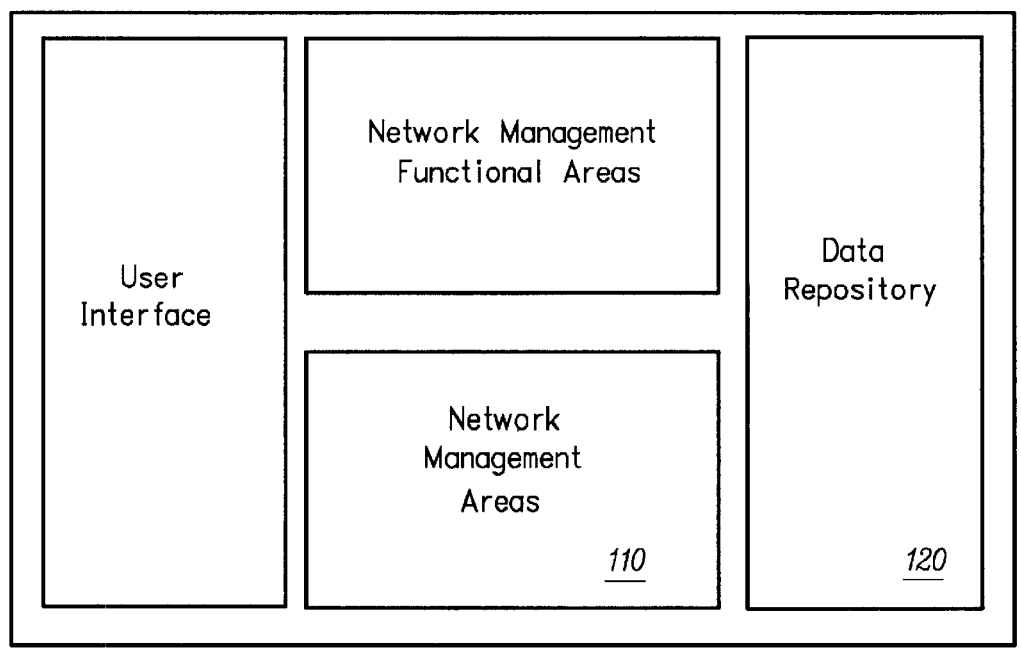
FIG. 1 shows a typical network management model.
Figure 2:
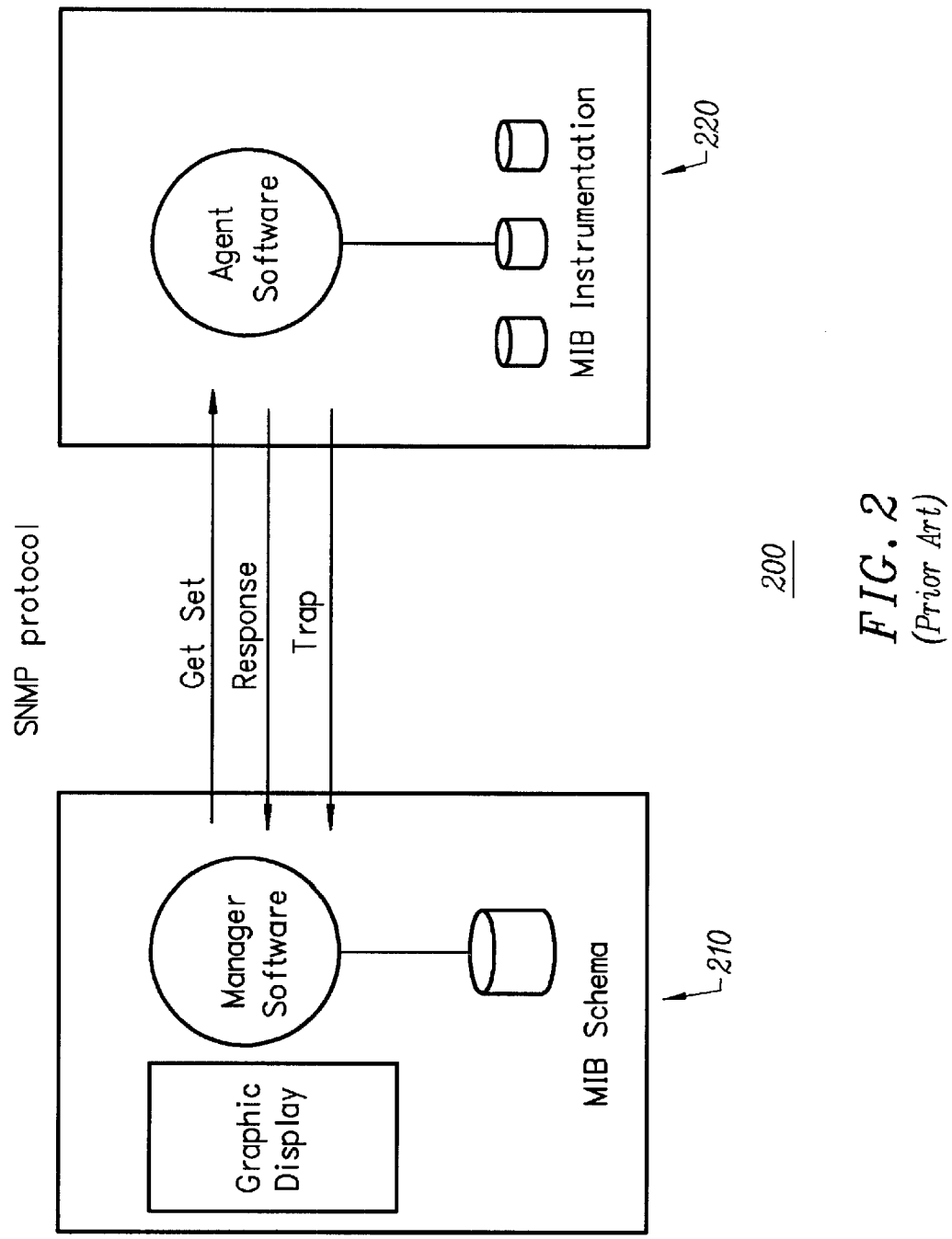
FIG. 2 shows a conventional network system having a network manager and a network agent.
Figure 3:
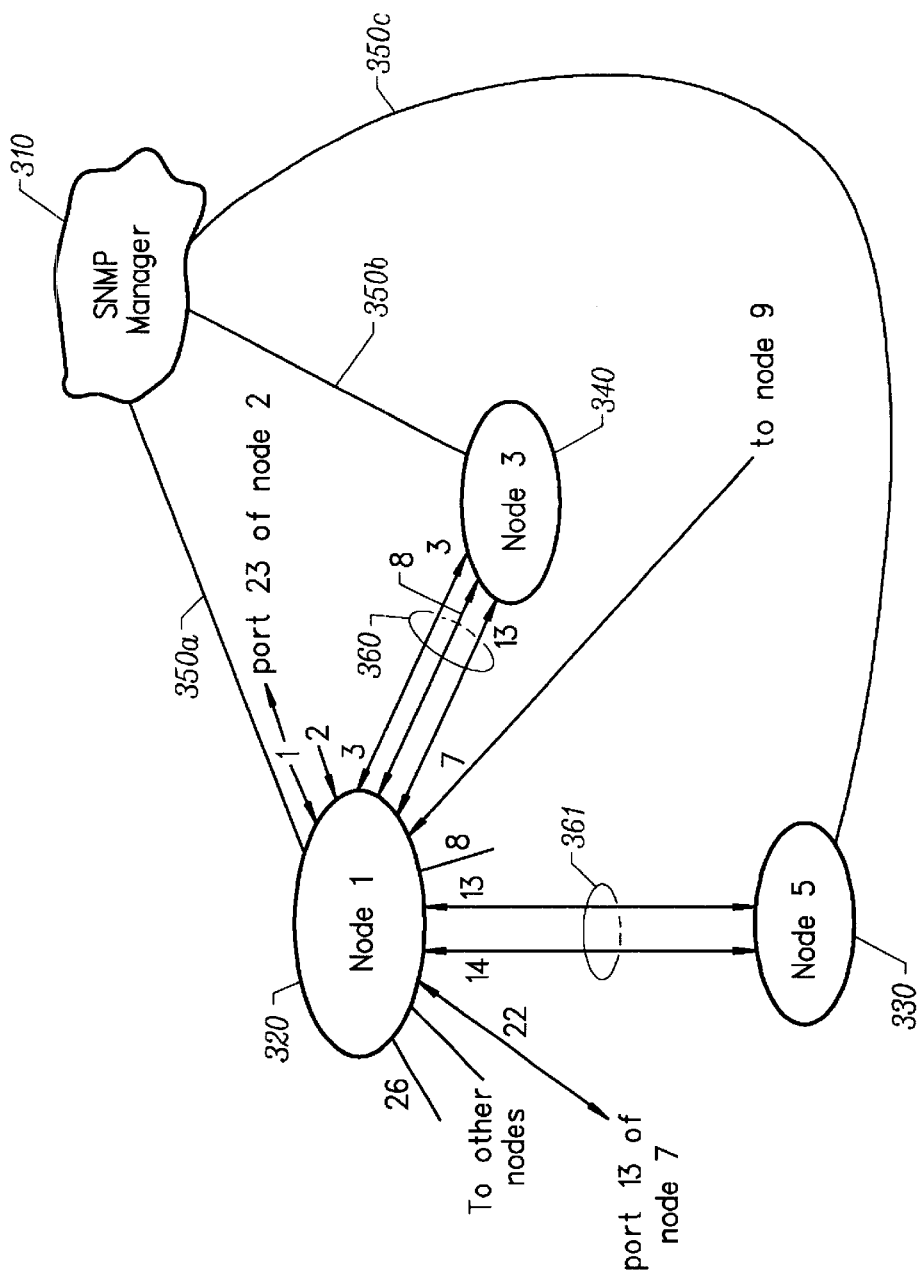
FIG. 3 shows a simplified network control system having a network manager and a plurality of network nodes connected to the network manager.

FIG. 3 shows a simplified network control system comprising a network manager 310 and a plurality of network nodes connected to the network manager. In this example, only three of the plurality of network nodes are shown: node 1 320, node 5 330, and node 3 340. Particularly, for illustration purposes, nodes 1, 3, and 5 represent three separate switching units. Each of nodes 1, 2, and 3 is connected to other nodes and/or other end-users. The switching units 320,330,340 are controlled by the network manager 310 through a group of control signals. 350a,b,c. These control signals 350a,b,c can in fact be embedded in the communication channels between the SNMP manager 310 and the switching units 320,330,340 in the network system. In this preferred embodiment, the network manager 310 is a SNMP manager responsible for managing the entire network. The SNMP manager 310 maintains and stores network data and information about the entire network and each of the units connected. These information, for example, contain network and node configuration data and performance information. More specifically, the configuration data contains individual port information of each node in the network. Under this port information, trunking and spanning tree information of each node are maintained in the SNMP manager 310.

As described above, nodes 1, 3, and 5 are switching units (switch 1, switch 2, switch 3). Each of these switching units 320,330,340 supports a plurality of communication ports for network communicating with other nodes and/or end-users. In the example as shown, each of ports 1, 2, 3, 7, 8, and 22 of switch 1 320 independently connects to other node or end-user in the network. On the other hand, two groups of the ports in switch 1 320 are trunked together for port aggregations. In the first trunking group 360, ports 3, 4 and 7 of switch 1 are trunked together to handle the network communications between switch 1 320 and switch 3 340. In the second trunking group 361, ports 13 and 14 are trunked together to handle the network communications between switch 1 320 and switch 5 330.

Particularly, a trunking group is a logical collection of physical ports that are treated as a single entity for forwarding and filtering purposes. In general, EBEE 802.3 ad specifies a data terminal equipment (DTE) to data terminal equipment (DTE) logical link that consists of N parallel instances of an 802.3 point-to-point link segment. The logical link supports existing 802.3 MAC clients. 802.3 ad defines the necessary management objects and protocols to support link aggregation, including identification, addition and deletion of link segments to and from the logical link. Basically, the purpose of trunking is to increase link availability and bandwidth between DTEs by specifying the necessary mechanisms for parallel link segment aggregation.

In order to provide network management functions such as the configuration management and performance management as described above, conventionally, the network manager 310 is required to have knowledge of all the port definition and assignment of each port belonging to each node in the network. Thus, the SNMP manager 310 usually maintains a database showing all port information of each node connected in the network system. For example, the SNMP manager 310 maintains a database having the following information: number of nodes in the network, identification of each node in the network; number of ports in each of the nodes; identification (port information) of each of the ports in each node. For example, in the network system as shown in FIG. 3, the network manager 310 contains information that switch 1 320 has 26 ports numbered 1 to 26. In addition, in the conventional network system, the network manager is required to maintain information that ports 3, 4, 7 of switch 1 320 are trunked together as the first trunking group 360 and ports 13 and 14 switch 1 320 are trunked together as the second trunking group.

On the other hand, according to the present invention, the network manager 310 is not required to maintain all port information on each node in the network. Most importantly, the network manager is only required to maintain a single virtual port information for an entire trunking group. Specifically, multiple ports are grouped together to form a virtual port so that the network manager can refer to the virtual port for addressing the entire group of trunking ports. This virtual port representation of multiple ports is especially. valuable for port trunking purpose because each of these multiple ports performs similar network functions (i.e. communication between two individual ports).

In the preferred embodiment, switch 1 320 comprises 26 physical ports. Among these 26 physical ports, ports 1 to 24 are regular 10 BASE-T/100 BASE-TX communication ports, and ports 25, 26 are gigabit ports used mainly for uplinking. Thus, each of these 26 physical ports is able to connect to another node or end users. In some cases, some of these ports can be left open and unused.

Figure 4:
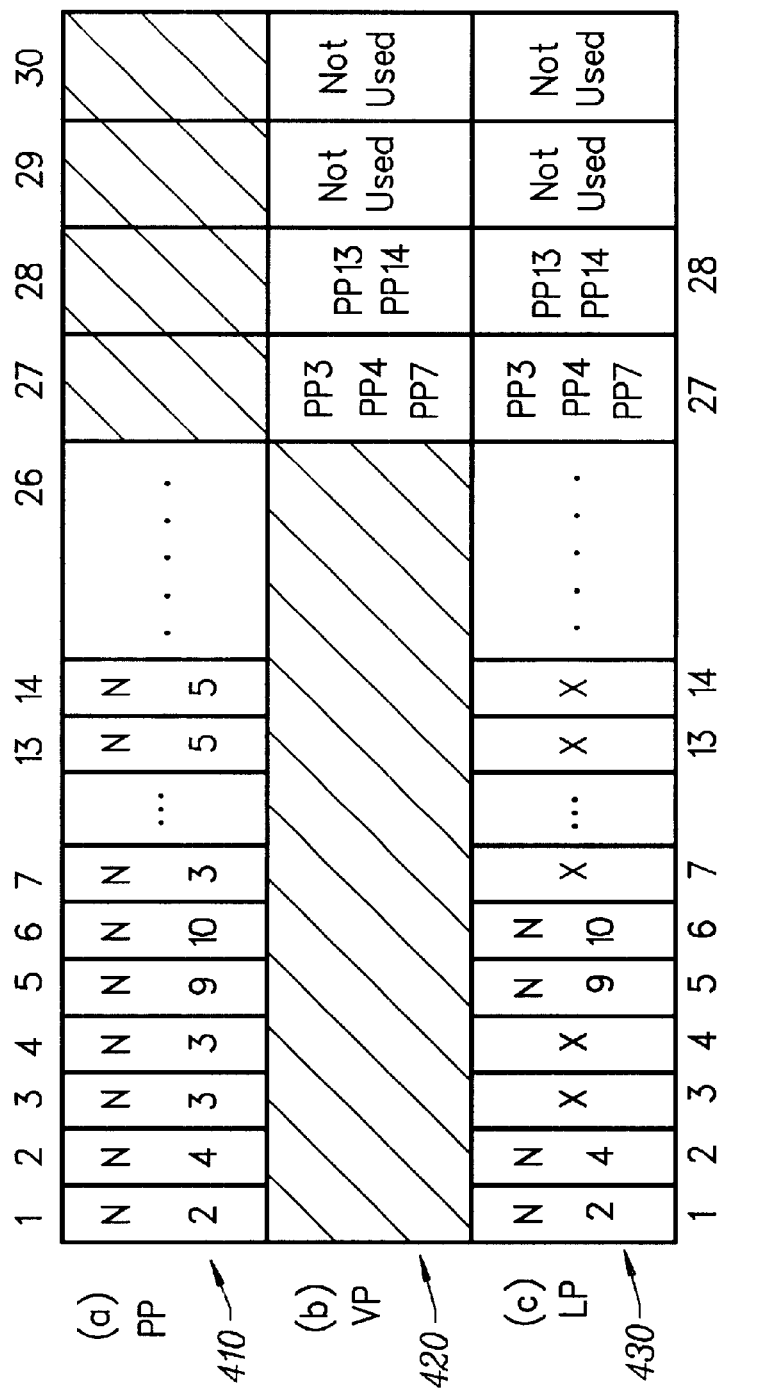
FIG. 4 shows a port mapping table according to the present invention.

FIG. 4 shows a port mapping table 400 according to the present invention. As shown in the figure, the port mapping table 400 comprises three portions: the first portion (PP 410), the second portion (VP 420), and the third portion (LP 430). Each of these three portions represents a different port assignment of switch 1 320 in the network system as shown in FIG. 3. Specifically, the first portion 410 represents the physical port assignments of switch 1 320. The second portion 420 represents the virtual port assignments of switch 1 320. Finally, the third portion 430 represents the logical port assignments of switch 1 320.

In the port mapping table as, shown, the first portion 410 represents all the physical ports available in switch 1 320. In this present example, switch 1 320 has 26 physical ports named port 1 to port 26. As shown in FIG. 3, port 1 of switch 1 320 connects to port 23 of node 2. Port 22 of switch 1 connects to port 13 of node 7 (node 7 not shown in FIG. 3). As discussed in the previous paragraphs, the two trunking group (i.e. the first trunking group 360 and the second trunking group 361) comprises ports 3, 4 and 7 and ports 13 and 14, respectively.

The second portion 420 of FIG. 4 illustrates the virtual port concept according to the present invention. In this example, instead of having only 26 physical ports, the second portion 420 shows an additional four virtual ports: port 27, port 28, port 29, and port 30 in switch 1 320. Each of these four virtual ports (i.e. port 27, port 28, port 29, and port 30) can be individually used to represent a trunking group of switch 1 320. In the preferred embodiment, one of the four virtual port numbers (i.e. 27–30) can be assigned to represent the entire trunking group. By using one virtual port number to represent a trunking group of ports, the SNMP manager 310 views the entire group of links as a single port having the aggregated communication capacity. In the example as shown, virtual port 27 is viewed by the SNMP manager 310 as a single port connected to node 2, having a combined network capacity of ports 3, 4, and 7. According to the present invention, the SNMP manager 310 simply views the entire trunking group as a single port. The resolution of this virtual port into its component ports of physical ports 3, 4, and 7 is performed in the switching unit alone. Thus, the entire trunking operation is thereby transparent to the network manager 310.

It should be noted that from the network manager 310 point of view, there are no difference between the physical ports and virtual ports because the network manager 310 will simply treat the virtual port as one port which have a higher bandwidth. The port configuration information and data maintained in the network manager 310 refers to the logical port numbers, instead of the physical port numbers in the conventional system. Because of the reduction of port numbers due to the combination of multiple physical ports into virtual ports, the port management functions required to be performed by the network manager 310 will be greatly reduced.

The third portion 430 of the port assignment table as shown in FIG. 4 shows the entire logical port assignment for switch 1 320 according to the present invention. As it can be seen, the logical ports as defined in this embodiment comprise both the physical ports and the virtual ports. In this example, the physical ports are numbered 1 to 26, whereas the virtual ports are numbered 27–30. In this example, virtual port 27 is defined as the first trunking group comprising physical ports 3, 4, and 7, and virtual port 28 is defined as the second trunking group comprising physical ports 13, and 14. In this preferred embodiment, because of the assignment of ports 3, 4, and 7 as the first trunking group, ports 3, 4, and 7 are then hidden in the logical port table. Similarly, ports 13 and 14 are hidden in the logical port table because of the assignment of virtual port 28.

Thus, as it can be seen in the figure, the complete logical port assignment of switch 1 320 are ports 1–2, 5–6, 8–12, 15–28, wherein ports 1–2, 5–6, 8–12, 15–26 correspond to physical ports and ports 27–28 correspond to logical ports. In other words, ports 1–2, 5–6, 8–12, 15–26 of switch 1 320 are the remaining physical ports after trunking. Port 27 is a virtual port representing the first trunking group of physical ports 3, 4 and 7. Port 28 is another virtual port representing physicals ports 13 and 14.

In this example, the port assignment of switch 1 320 as seen by the network manager 310 comprises only 23 logical ports: ports 1–2, 5–6, 8–12, 15–28. Comparing to 26 physical ports as shown in the first portion of the table, the number of ports is reduced by three because of the assignment of the two virtual ports according to the present invention. By combining multiple physical ports into a virtual port, the network manager 310 will have less overhead in maintaining the configuration data. In addition, less network control traffic is needed between the network manager and the node because of not necessary to control the number of trunking ports in group.

In one preferred embodiment according to the present invention, the switching unit 310 will send an enterprise-specific trap to the network manager 310 to signify that the switching unit 310 recognizes some changes in the status of an virtual port in the switching unit 310. These changes, for example, include status information on any of the ports, and addition or deletion of a physical port(s) from any of the virtual ports (i.e. port 27 and port 28), etc.

FIG. 5 shows a table 510 illustrating the virtual port assignment to the example as shown in FIGS. 3 and 4. In the preferred embodiment, this table 510 is maintained in the switch which supports the virtual port function. The table conversion using this virtual port table is performed in the switch so that the port configuration data maintenance in the network manager is reduced. In this preferred embodiment as shown, switch 1 320 is capable of handling up to 4 virtual ports. However, the number of 4 virtual ports is chosen for illustration purposes only. Other numbers of virtual ports can be similarly implemented. In this example, virtual port 27 is assigned as a port representing the first trunking group comprising physical ports 3, 4 and 7 of switch 1 320. Virtual port 28 is assigned as a port representing the second trunking group comprising physical ports 13 and 14 of switch 1 320. In this example, virtual ports 29 and 30 are not assigned with any physical ports by the user.

FIG. 6 shows a virtual port table 600 of another preferred embodiment according to the present invention. This table 600 is similar to the table 500 as shown in FIG. 5. The difference is the additional third column. This third column of FIG. 6 illustrates another feature of the present invention. That is, the present invention can also handle stacked switching systems. Particularly, a stacked switching system is a group of individual switches connected together as a stacked switching unit. In one example according to the present invention, a novel switching system is disclosed with a copending patent application titled "Intelligent Stacked Switching System" by the same inventor Tomoyuki Sugihara, filed on Jun. 24, 1999, which is hereby incorporated by reference in its entirety.

In the virtual port assignment table as shown in FIG. 6, the table comprises an additional "Stacked ID" column which contains stacked unit IDs corresponding to the physical ports for trunking. For example, in the first entry represents all the virtual port information of virtual port 27. In this example, virtual port 27 is assigned as the first trunking group. According to the table, virtual port 27 comprises physical ports 3, 4 and 7 from the first stacked unit (i.e. S1)

Similarly, the second entry of the table represents all the virtual port information for virtual port 28. In this example, virtual port 28 is assigned as the second trunking group. The second trunking group comprises physical member ports 13 and 14 from the first stacked unit (i.e. S1).

It should be noted that the physical member ports of each of the virtual ports are not required to locate in a same stacked switching unit. In other words, member ports spreading different stacked switching units can be grouped in one virtual port. In an example not shown, virtual port 27 of stacked switching unit 1 may comprises physical ports 1, 5 of first stacked switching unit and ports 8, 14 of the second stacked switching unit. In this case, the member ports information in each virtual port will contain the stacked unit numbers, in addition to the port numbers as shown in FIG. 6. For example, virtual port 27 of stacked switching unit 1 may contain the following information: 0101, 0105, 0208, 0214 (wherein the first two digits refer to the stacked unit number and the final two digits refer to the physical port number, i.e. in an "uupp" format). In order to implement this design, a more sophisticated stacked controller is needed to interpret the both the stacked unit ID and physical port numbers.

Figure 7:
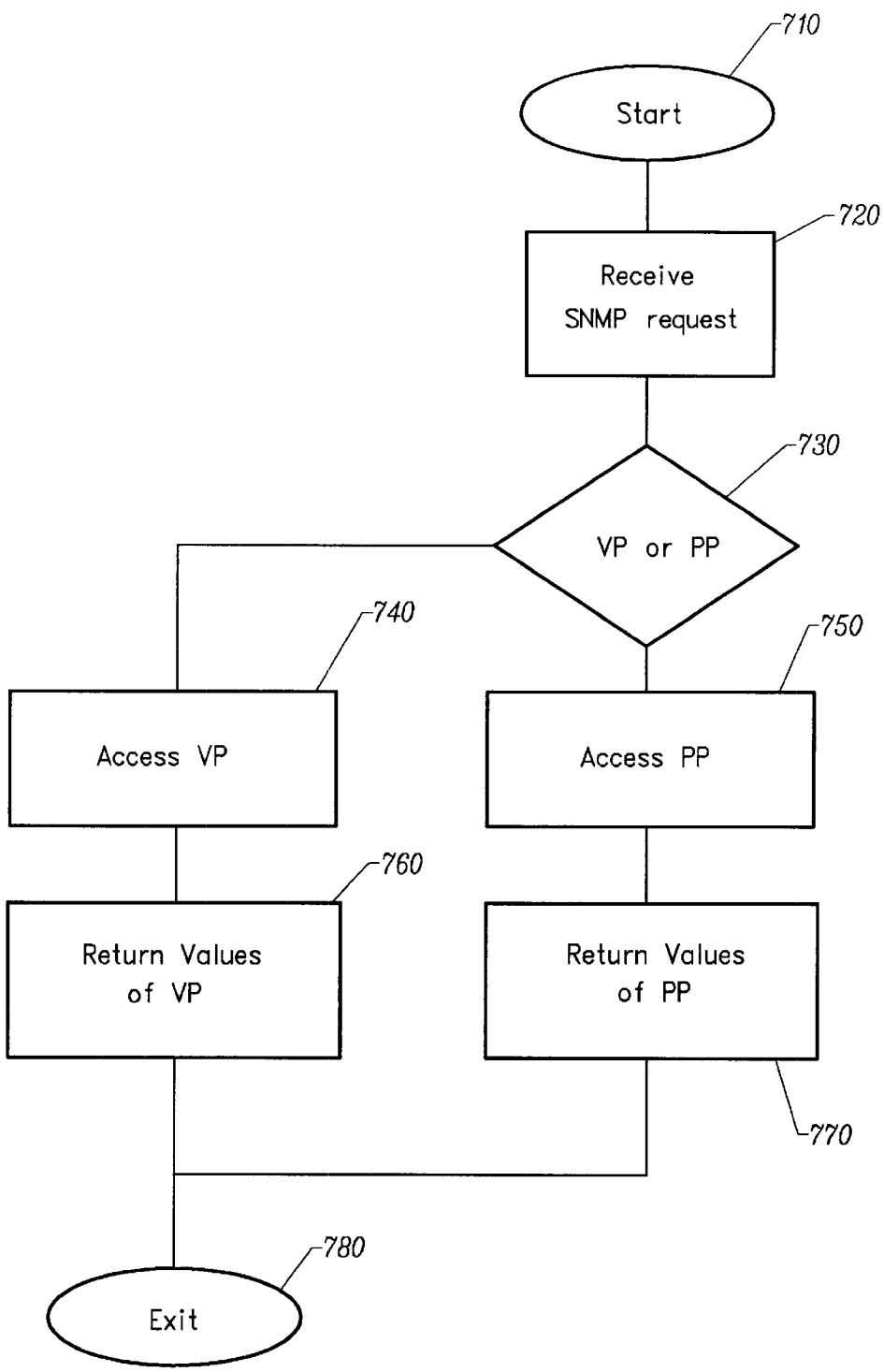
FIG. 7 is a flow chart showing the process in the node side to handle requests from the network manager.

FIG. 7 is a flow chart showing the process in the node side to handle requests from the network manager. Step 710 represents the beginning of the process. In step 720, a SNMP request is received by the node. In step 730, a determination is performed to determine whether the SNMP request is a virtual port request or a physical port request. This determination can be performed in the agent by comparing the requested port number with a port assignment table as shown in FIG. 5 or 6. When the port destination uupp indicates a virtual port is requested, the appropriate conversion is performed according to the port assignment table so that the requested information from the corresponding physical ports are retrieved in Step 740. The requested information is then returned to the SNMP network manager in Step 760. On the other hand, if the uupp indicates a physical port is requested, the corresponding physical port is accessed in Step 750. The requested information is then returned to the SNMP network manager in Step 770. After the requested information is returned to the SNMP network manager, the process is ended in Step 780.

Figure 8:
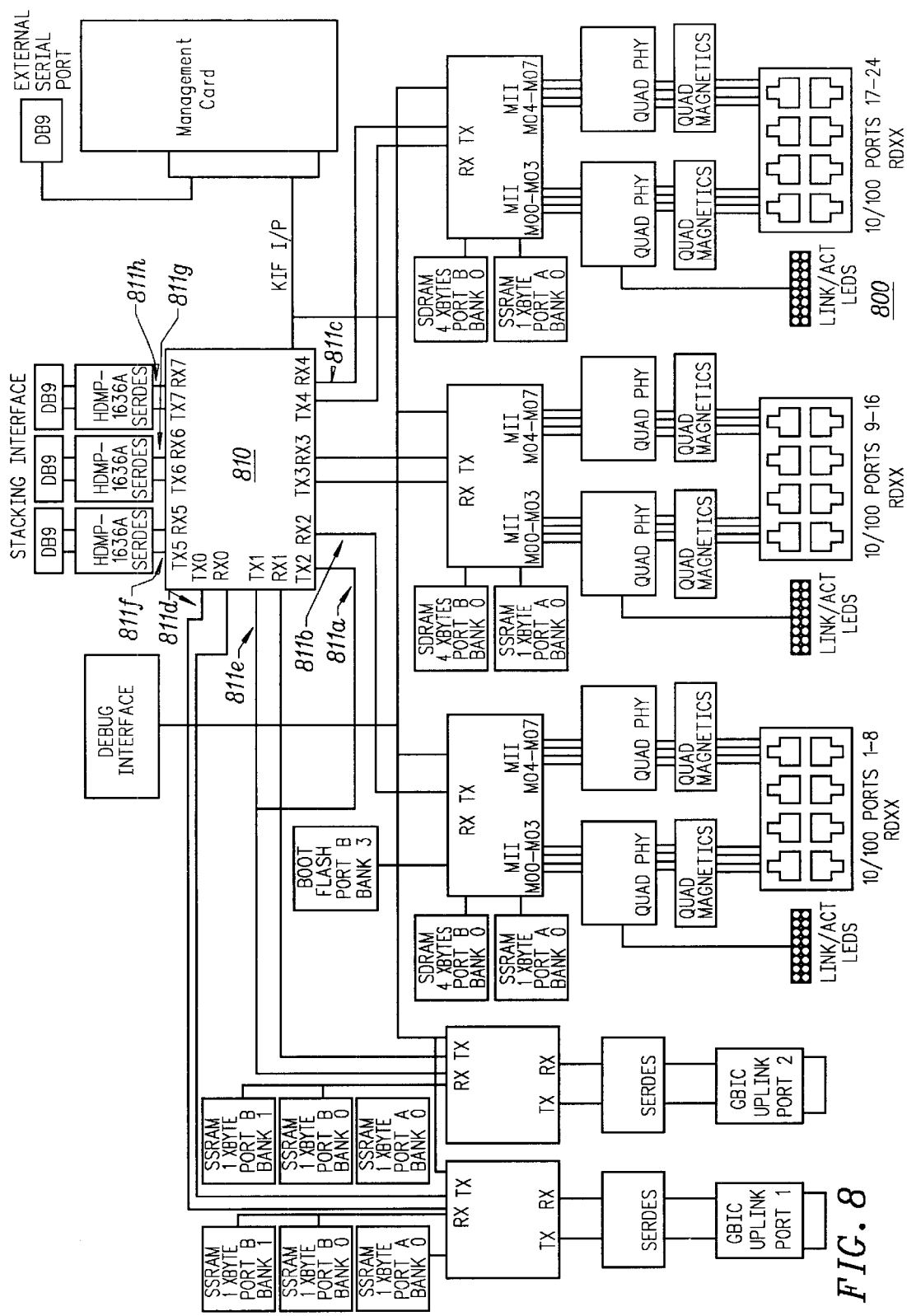
FIG. 8 shows a block diagram of a preferred embodiment of a switching unit according to the present invention.

FIG. 8 shows a block diagram of a preferred embodiment of each of the switches according to the present invention.

As shown in the figure, each switching unit 800 according to the present invention comprises a switching matrix 810 having eight bus ports 811a,b,c,d,e,f,g,h: In the preferred embodiment as shown, three of the eight bus ports are ethernet ports 811a,b,c, and two of the eight bus ports are gigabit uplink ports 811d,e. The remaining three bus ports 811f,g,h are reserved for the stacking links between switching units. In the preferred embodiment, each of the three ethernet ports 811a,b,c supports eight ethernet ports 10 Base-T/100 Base-TX ethernet ports. Each of them has eight MII fast internet ports and connects to two quad magnetic devices. These quad magnetic devices are used for isolating the internet ports from the RJ45 connectors. In addition, each of these ethernet port controllers is supported by two separate memory ports for storing data management information such as address lookup data and input/output buffered data. Individual users can connect to the switching unit through any of these 24 ethernet ports. It should be noted that the present invention could be used in either the half-duplex or full-duplex connection. Further, in the preferred embodiment as shown, each of the two gigabit uplink ports 811d,e is responsible for gigabit uplink. As shown in the figure, each of these two gigabit uplink ports 811d,e is supported by three memory modules for storing address lookup data and buffered data packet.

As stated above, the remaining three ports 811f,g,h of the switching matrix 810 are specifically reserved for stacking purposes. By connecting one or more of these three ports 811f,g,h to the stacking ports of other switching unit(s), a stacked switching system is created.

According to the present invention, the three set of the 10 BASE-T/100 BASE-TX ports as shown in the figure are numbered as ports 1–24. Ports 25 and 26 are two gigaports for uplink purpose. Thus, in the preferred embodiment, any combination of ports chosen from ports 1–26 can be assigned as virtual ports 27, 28, 29 or 30.

It is to be understood that while the invention has been described above in conjunction with preferred specific embodiments, the description and examples are intended to illustrate and not limit the scope of the invention, which is defined by the scope of the appended claims.

What is claimed is:

1. A network switch, comprising:
a plurality of physical ports;
a communication backplane coupled to said plurality of physical ports; and
a memory connected to said communication backplane; said memory storing:
physical port entries,
virtual port entries, including a virtual port defining a set of grouped physical ports, and
logical port entries, including physical port entries and a virtual port entry, said virtual port entry defining said set of grouped physical ports, said physical port entries masking said set of grouped physical ports.

2. The network switch of claim 1 wherein said network switch views said virtual port as a trunking group including a logical collection of physical ports that are treated as a single entity for forwarding purposes.

3. The network switch of claim 1 wherein said network switch views said virtual port as a trunking group including a logical collection of physical ports that are treated as a single entity for filtering purposes.

4. The network switch of claim 1 in combination with a network manager, said network manager maintaining only virtual port information for said set of grouped physical ports.

5. The network switch of claim 4 wherein said network manager views said virtual port as a single port with aggregated communication capacity corresponding to said set of grouped physical ports.

6. The network switch of claim 5 wherein said network switch resolves said virtual port into its component physical ports in response to a command from said network manager.

7. The network switch of claim 1 wherein said port mapping table specifies a stacked unit identification corresponding to said virtual port.

8. A method of operating a network switch, comprising:
receiving a command from a network manager;
mapping said command into a port mapping table specifying:
physical port entries,
virtual port entries, including a virtual port defining a set of grouped physical ports, and
logical port entries including physical port entries and a virtual port entry, said virtual port entry defining said set of grouped physical ports, said physical port entries masking said set of grouped physical ports; and
responding to said command based upon said mapping.

9. The method of claim 8 wherein said mapping includes mapping said command to said virtual port and thereafter treating said virtual port as a trunking group including a logical collection of physical ports that are treated as a single entity for forwarding purposes.

10. The method of claim 8 wherein said mapping includes mapping said command to said virtual port and thereafter treating said virtual port as a trunking group including a logical collection of physical ports that are treated as a single entity for filtering purposes.

11. The method of claim 8 wherein said mapping includes resolving said virtual port into its component physical ports.

12. The method of claim 8 wherein said mapping includes mapping said virtual port to a corresponding stacked unit identification.

* * * * *